(No Model.)
G. F. COOK.
PROCESS OF MANUFACTURING FLAKED RICE, &c.
No. 598,137. Patented Feb. 1, 1898.
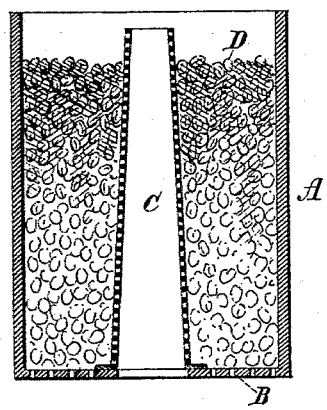
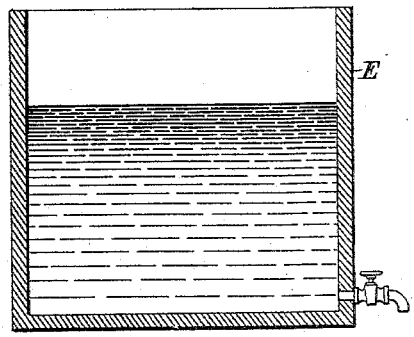
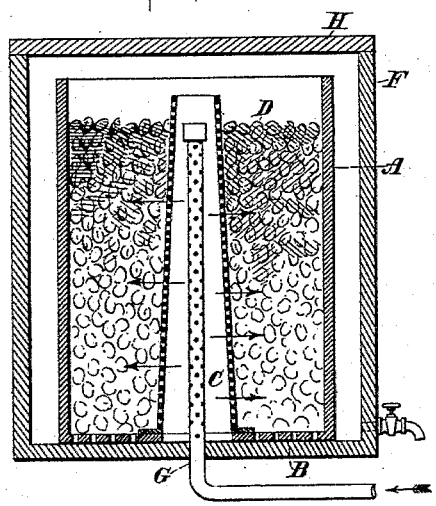
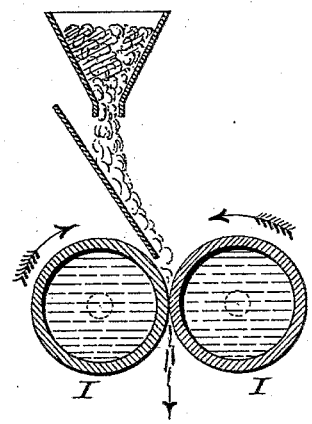
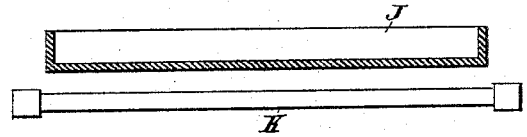
WITNESSES:
Gustave Dieterich
John Kehlenbeck
INVENTOR
George F. Cook,
BY
Chas. C. Gill
ATTORNEY.
THE NORRIS PETERS CO., PHOTO-LITHO., WASHINGTON, D. C.

UNITED STATES PATENT OFFICE.

GEORGE F. COOK, OF MATAWAN, NEW JERSEY, ASSIGNOR TO THE AMERICAN RICE FOOD AND MANUFACTURING COMPANY, OF SAME PLACE.

PROCESS OF MANUFACTURING FLAKED RICE, &c.

SPECIFICATION forming part of Letters Patent No. 598,137, dated February 1, 1898.

Application filed February 4, 1897. Serial No. 622,008. (No specimens.)

*To all whom it may concern:*

Be it known that I, GEORGE F. COOK, a citizen of the United States, and a resident of Matawan, in the county of Monmouth and State of New Jersey, have invented certain new and useful Improvements in Processes of Manufacturing Flaked Rice and other Cereal Products, of which the following is a specification.

The invention relates to improvements in processes of the manufacturing flaked rice and other cereal products; and it consists in the novel processes, hereinafter described and claimed, by which the rice in its known commercial form is transformed into cooked rice flakes ready for the market.

In carrying my invention into effect I take the cleaned rice in the grain and soak it in hot water for about, say, ten minutes, or until the grains have become swollen or softened, and then allow it to stand until the water has pretty thoroughly drained off, this requiring, according to my practice, about twenty minutes. After this I subject the mass of rice while held within a closed receptacle to a dry-steam pressure of about sixty pounds for about five minutes, the steam being freely delivered in the form of jets or fine streams through the body of the mass of rice and the moisture and liquid at the base of the mass being drawn off or permitted to escape. The rice while hot is then at once passed through chilled reducing or crushing rolls, which reduce the same to individual flakes, which are then thoroughly cooked, the product being thus made ready for the market and being thoroughly-cooked rice flakes.

In the accompanying drawings I illustrate diagrammatically the various steps of the process above described, and in the drawings Figure 1 is a central vertical section through a receptacle into which I place the rice preparatory to the soaking of the grain and the subsequent steaming of the grain. Fig. 2 is a like view of a receptacle containing hot water, into which the receptacle shown in Fig. 1, containing the rice, is placed in the carrying out the first step of my process. Fig. 3 is a like view of the closed receptacle within which the mass of rice is subjected to dry-steam pressure. Fig. 4 is a like view of the chilled reducing-rolls and means for feeding the hot rice thereto preparatory to the rice being reduced to well-defined individual flakes by the action of the chilled rolls, and Fig. 5 is a like view of one of the pans located over a coil of steam-pipe and within which pan the flakes of rice are thoroughly cooked as the final step in the process above described.

In the drawings, A designates a cylindrical receptacle having a perforated bottom B and a central perforated sleeve C. The grains of rice to be treated are placed within the receptacle A, and the first step of the process is then carried out by immersing the receptacle A, containing the rice D, into the hot water contained within the receptacle E. After the rice has remained within the receptacle E a sufficient length of time the receptacle A is removed therefrom and the water allowed to drain off, and thereupon the receptacle A, still containing the rice, is inserted into the receptacle F, the sleeve C passing downward over the central perforated steam-pipe G. The receptacle F will be closed by a cover H and the steam will be turned into the pipe G. The steam will escape through the perforated end of the pipe G and be directed throughout the mass of rice D, as indicated by the arrows in Fig. 3. After the rice has been sufficiently treated within the receptacle F the cover H is removed and the receptacle A is withdrawn, and thereupon the rice will, while hot, be delivered to the chilled reducing-rolls I I, by which it will be reduced to well-defined individual flakes. The flakes produced by the chilled reducing-rolls I I are then placed within the shallow pan J, located over the steam-coil K, said flakes being thoroughly cooked in said pan J and thereby made ready for the market. The rice flakes are cooked thoroughly dry in the pan J and after leaving the pan J are ready to be placed into suitable packages for the market.

The rolls I I, in accordance with the present invention, are not merely solid metallic rolls, ordinarily termed "cold" rolls, but are chilled rolls, and are maintained at the chilling temperature throughout the entire time of their use. I employ a circulating body of ice-water within the rolls I I, as indicated in Fig. 4, the ice-water maintaining the rolls I I at a chilling temperature and preventing the rolls from becoming heated by the usual friction generated during their use. It is an important step of the present process that the hot grains of partially-cooked rice are subjected to the chilled reducing-rolls I I, since thereby the grains of rice are evenly reduced to individual flakes which readily leave the rolls and are distinctive in their complete individuality, cohesion, appearance, and quality, and are incapable of production by means of hot rolls or by the solid metal rolls, ordinarily termed in this art "cold" rolls, which latter rolls will not remain cold in use, but will become heated by friction during use. There is a very decided difference in temperature between the hot rice and the chilled rolls, and this difference in temperature is utilized by me in the effective production of the individual flakes of rice, the surfaces of the grains while being reduced being directly subjected to the chilling temperature of the rolls I I.

The steaming process above referred to will vary somewhat according to the changes in the barometer, but I have specified the average treatment and it will usually be found to be entirely satisfactory.

The final dry cooking of the flakes of rice in the pan J is a step in the process which insures highly-desirable results and leaves the flakes in a condition for the market.

I am aware that it has been proposed to use rolls having at the starting of the process the temperature of the atmosphere of the mill, these rolls being solid metal rolls and ordinarily termed "cold" rolls; but these rolls are not of the character used by me in the foregoing process and they are not chilled rolls, nor do they remain even at the atmospheric temperature, but, on the contrary, become quickly heated by the usual friction generated during their use. The rolls employed in my process are distinctly chilled rolls and they are kept constantly chilled during their use, and by the use of the chilled rolls as distinguished from ordinary cold rolls to receive the partially-cooked rice I am enabled to attain perfectly successful results and a product capable of being thoroughly cooked without disintegration of the flakes, the final marketable product being thoroughly-cooked rice in the form of consistent well-preserved flakes of desirable character and quality.

My invention is based in part on the discovery that the subjecting of the hot rice to the artificially-chilled rolls results in the individual flakes being, first, in effect case-hardened; second, preserved in their distinct individuality instead of issuing from the rolls in a conglomerate tacky mass, and, third, able to leave the rolls without having to be forcibly removed therefrom by the use of scrapers adjusted to the rolls.

While I especially desire to protect the manufacture of rice flakes by the process or processes above described, having reduced this art to a commercial success, I wish it to be understood that I use the word "rice" in some respects in an illustrative sense, and do not wish it to be confined to the treatment of rice alone.

What I claim as my invention, and desire to secure by Letters Patent, is—

1. The art of producing rice flakes, which consists in soaking the grains, steaming the mass and then passing the rice while hot between chilled reducing-rolls to reduce the grains to individual flakes, said rolls being maintained at their chilling temperature during the passage of the hot grains of rice between them; substantially as set forth.

2. The art of producing rice flakes, which consists in soaking the grains, then steaming the grains, then reducing the grains to individual flakes by passing the steamed grains while hot between chilled reducing-rolls and finally thoroughly dry cooking the flakes, the said rolls being maintained at their chilling temperature during all of the time the hot grains of rice are passing between them; substantially as set forth.

3. The art of producing rice flakes from softened and heated grains of rice, which consists in passing the grains while hot between chilled reducing-rolls, the latter being maintained at their chilling temperature during all of the time the hot grains of rice are passing between them; substantially as set forth.

Signed at New York, in the county of New York and State of New York, this 2d day of February, A. D. 1897.

GEORGE F. COOK.

Witnesses:
CHAS. C. GILL,
E. JOS. BELKNAP.